Leonard Heckenstein's Corrugated Gum Scrubber.

PATENTED
JAN 7 1868

72993

Inventor.
Leonard Heckenstein

Witnesses.
W. B. Wiley
Jacob Stauffer

United States Patent Office.

LEONARD FLECKENSTINE, OF MANOR TOWNSHIP, PENNSYLVANIA.

Letters Patent No. 72,993, dated January 7, 1868.

IMPROVED HOLDER FOR GUM SCRUBBER.

*The Schedule referred to in these Letters Patent and making part of the same.*

TO ALL WHOM IT MAY CONCERN:

Be it known that I, LEONARD FLECKENSTINE, of Manor township, in the county of Lancaster, and State of Pennsylvania, have invented a new and improved Mode for Constructing Holders for a Gum Scrubber; and I do hereby declare that the following is a full and exact description thereof, reference being had to the accompanying drawings, making a part of this specification, in which—

Figure 1:
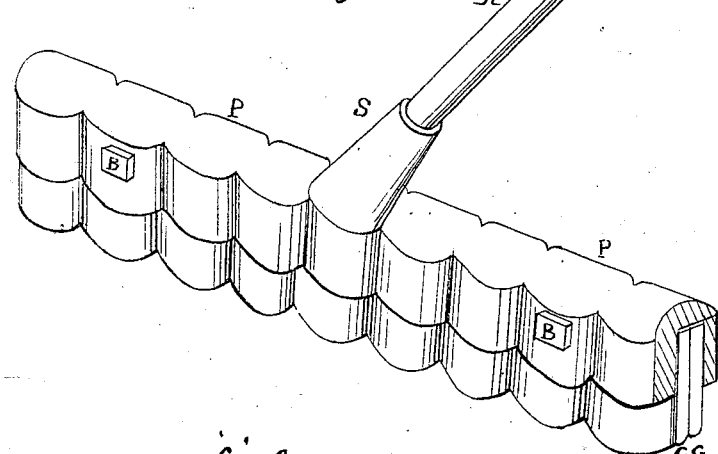
Figure 1 is a perspective view of my scrubber-holder with the gum in place.
Figure 3:
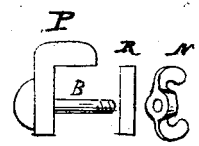
Figure 2:
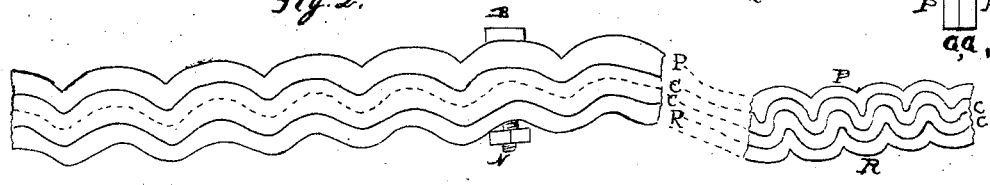
Figure 2 shows the scalloped or fluted sides of the holder, and gum clamped between the fixed and loose plates.

Figure 3, end views of the same combined, and the parts shown detached; G G, the India rubber interposed.

The nature of my invention consists in fluting or corrugating the holders, so that the gum employed will also assume a corrugated form, thereby stiffening it, and so as greatly to increase its scrubbing quality and efficiency, which is not the case when the same is used in straight strips between straight holders, presenting a straight scrubbing-surface or edge to the floor.

To enable others skilled in the art to make and use my invention, it is only necessary to say that my stationary portion, P, is of the desired length and width, has a socket S, centrally, for the handle H. The top may be slightly rounded, while the under side of the top is made at right angles to the corrugated side portion. A loose corrugated piece, R, cast so that the fluting or curves will coincide, or made to match, when applied to its right-angled counterpart, P, as seen by fig. 3. The plates P and R have holes near their ends for a headed bolt, B, with a screw-end for a thumb-screw or binding-nut, N. The rubber cloth, as stout or as thick as wished, is cut the desired length and width. Two oblong holes are made so as to match the holes for the two bolts. These are placed between the fluted or corrugated plates, the headed bolt passed through them, the loose plate R put in its place and secured by the thumb-screw, tightly clamping two, three, or more plies of rubber between them, giving to the projecting edge of the gum the corrugated folds of the heads. The object for elongating the holes in the gum is for the purpose of drawing the same out, by slacking the thumb-screws as the edges wear off, to utilize a greater portion of the gum.

I am aware that India rubber, used as a scrubber, is not new, used combined with a mop-cloth or otherwise. I am aware also that clamps are used with a deep groove and compresser-rod, operated by thumb-screws; also of mop-heads being used in two parts, joined by a headed bolt and nut; also fingers interlock to hold the cloth, not applicable to my use. When the gum or rubber comes in contact with the floor with its straight and flaccid edge, it fails to perform its duty as a scrubber.

I am not aware that in order to overcome this serious objection, corrugated or fluted holders have ever been used or thought of before, and by which means the India rubber is moulded into short turns, or crimpled in a manner as to greatly increase its stiffness and scrubbing-qualities, and so as to give it the efficiency desired, and heretofore not obtained.

I do not broadly claim using gum for scrubbing, nor a mop-head made in two parts, held by bolts and screws; such have been in use before.

What I claim as my invention, and desire to secure by Letters Patent, is—

The arrangement of the two corrugated or fluted plates P R, for the purpose of folding the scrubbing-edges of India rubber, together with the use of a socket and screw-bolts, substantially in the manner shown and specified

LEONARD FLECKENSTINE.

Witnesses:
 WM. B. WILEY,
 JACOB STAUFFER.